United States Patent
Ukon et al.

(10) Patent No.: US 7,660,237 B2
(45) Date of Patent: Feb. 9, 2010

(54) SYNCHRONOUS CLOCK SUPPLY SYSTEM AND SYNCHRONOUS CLOCK SUPPLY METHOD

(75) Inventors: Shinichi Ukon, Tokyo (JP); Kenichi Kobayashi, Tokyo (JP)

(73) Assignee: NEC Infrontia Corporation, Kanagawa (JP)

( * ) Notice: Subject to any disclaimer, the term of this patent is extended or adjusted under 35 U.S.C. 154(b) by 898 days.

(21) Appl. No.: 10/750,956

(22) Filed: Jan. 5, 2004

(65) Prior Publication Data
US 2004/0153897 A1 Aug. 5, 2004

(30) Foreign Application Priority Data
Jan. 7, 2003 (JP) .............................. 2003-001222

(51) Int. Cl.
*G06F 11/00* (2006.01)

(52) U.S. Cl. .................. 370/223; 370/503; 714/100; 714/744

(58) Field of Classification Search ............... 370/216, 370/241.1, 242, 503
See application file for complete search history.

(56) References Cited
U.S. PATENT DOCUMENTS

| | | | | |
|---|---|---|---|---|
| 6,538,987 B1* | 3/2003 | Cedrone et al. | ............... | 370/216 |
| 7,003,696 B1* | 2/2006 | Shiota | ............... | 714/23 |
| 7,072,302 B1* | 7/2006 | Storr | ............... | 370/236.1 |
| 7,092,361 B2* | 8/2006 | Puppa et al. | ............... | 370/242 |
| 7,177,327 B2* | 2/2007 | Murata | ............... | 370/503 |
| 2002/0031199 A1* | 3/2002 | Rolston et al. | ............... | 375/356 |
| 2002/0181480 A1* | 12/2002 | Puleston | ............... | 370/408 |
| 2004/0213247 A1* | 10/2004 | Seki et al. | ............... | 370/395.1 |

FOREIGN PATENT DOCUMENTS

| | | |
|---|---|---|
| JP | 01231450 | 9/1989 |
| JP | 2000-286857 | 10/2000 |

* cited by examiner

*Primary Examiner*—Chirag G Shah
*Assistant Examiner*—Salvador E Rivas
(74) *Attorney, Agent, or Firm*—Young & Thompson (57) ABSTRACT

A switching unit ($101_1$) receives video data (103) sent from a device (102), and sends an ATM cell synchronized with the clock to switching units ($101_2$-$101_4$) by a signal (including optical data) containing a frequency component serving as a synchronous clock supply source. If a fault occurs midway along a line, the switching unit ($101_2$) which detects the fault sends an AIS cell to an OAM connection (109). The termination switching unit ($101_4$) switches a port f for receiving a synchronous clock to a port g, and sends back an RDI cell. The switching units ($101_3$, $101_2$) which have received the RDI cell switch the synchronous clock to ports e and c and receive it, thus obtaining an identical clock.

17 Claims, 7 Drawing Sheets

| PRIORITY | SECOND SWITCHING UNIT | THIRD SWITCHING UNIT | FOURTH SWITCHING UNIT | FIFTH SWITCHING UNIT | SIXTH SWITCHING UNIT | SEVENTH SWITCHING UNIT |
|---|---|---|---|---|---|---|
| "1" | b | d | f | n | j | h |
| "2" | c | e | ℓ | o | k | i |
| "3" | m | | | | p | |

(CLOCK SUPPLY LINE PRIORITY TABLE)

FIG. 11
PRIOR ART

SYNCHRONOUS CLOCK SUPPLY SYSTEM AND SYNCHRONOUS CLOCK SUPPLY METHOD

BACKGROUND OF THE INVENTION

The present invention relates to a synchronous clock supply system and synchronous clock supply method which supply a synchronous clock to each node such as a switching unit in an ATM (Asynchronous Transfer Mode) network and, more particularly, to a synchronous clock supply system and synchronous clock supply method capable of reconfiguring a clocked network when supply of a clock is cut off due to a fault or the like in part of a line which connects nodes.

The ATM has been developed as a multimedia application transmission medium, and is currently used as one of backbone techniques of the Internet. The ATM network is widely utilized for asynchronous data in a LAN (Local Area Network) represented by the Internet, and also synchronous data such as audio data and video data (these data will be generally referred to as application data hereinafter).

To exchange application data of a synchronous system between terminals, these terminals must be synchronized by clocks. To relay data of a synchronous system by using the ATM network, the ATM network must be synchronized by clocks. This requires construction of a clocked topology as a network layout structure which is hardly influenced by an external factor such as a fault in the ATM network.

In designing an ATM network, the ATM network designer conventionally sets a clocked network for each ATM node in the network. The ATM node means an element device such as a switching unit or terminal which configures a network. Conventionally, a clock synchronization source is set or switched for each ATM node such as a switching node. More specifically, the network designer determines a switching unit serving as a clock synchronization source in advance. The determined switching unit uses a clock. At the remaining nodes, clock supply ports for receiving clocks at the nodes are so determined as to make a clocked topology unique.

In a network, a fault may occur in a clock supply route depending on a line fault or the like. One clock supply route will be considered. In a conventional synchronous clock supply system, synchronous clocks are sequentially supplied from a clock supply source to nodes via a predetermined route. If a fault occurs in an upstream node closer to the clock supply source, no synchronous clock is supplied to a downstream node. The downstream node cannot be synchronized by the clock.

To prevent this, the first technique (Japanese Patent Laid-Open No. 1-231450) in which each node can select and use one of a plurality of prepared clock supply ports and a clock supply port for receiving a clock having the next or subsequent priority can also be determined has conventionally been adopted. In the first technique, oscillation precision priorities (priority order) are assigned to a plurality of clocks. These clocks are exchanged with priorities between communication devices which use the clocks as synchronous clocks. The priority of a synchronous clock which generates a fault in a clock supply route is decreased. Communication devices can always be operated by a clock having high priority, increasing the synchronization precision and coping with occurrence of a fault in the clock supply route.

In the conventionally proposed second technique (Japanese Patent Laid-Open No. 2000-286857), a plurality of ATM switches serve as clock supply sources, and priorities (priority levels) are set for clocks supplied by the ATM switches. When a fault occurs in a line, the clock supply source of a switch having the highest priority among fault-free ATM switches is used to supply a clock to other ATM switches.

In the first technique, however, when a fault occurs in the clock supply route, a different clock is supplied from the same clock supply source to each communication device. This technique cannot perform high-precision synchronization processing of supplying an identical synchronous clock from one supply source to each network portion.

Also in the second technique, when a fault occurs in a line, a different ATM switch is used as a clock supply source. The second technique cannot achieve high-precision synchronization processing of supplying an identical synchronous clock from one supply source to each network portion.

Figure 11:
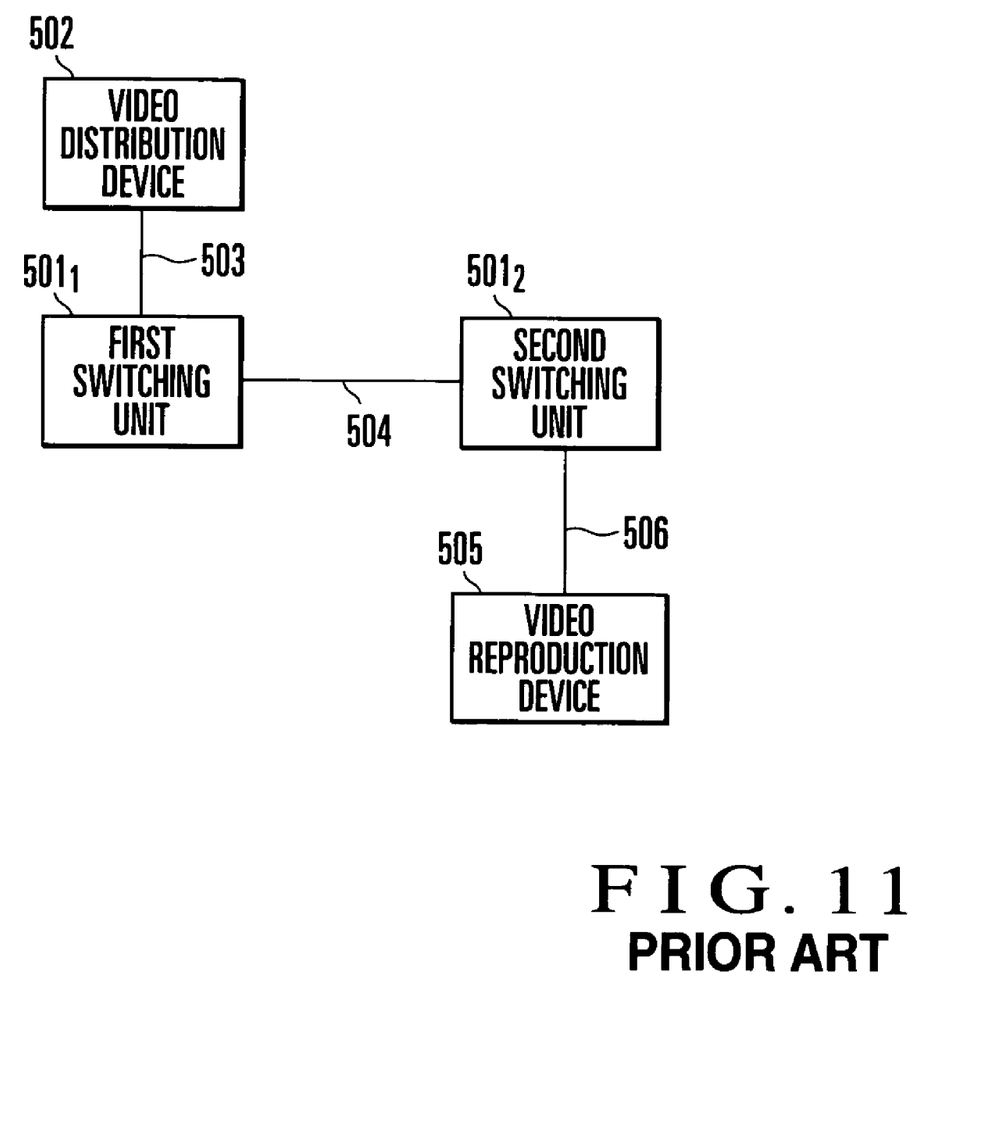
FIG. 11 is a block diagram showing an example of a network for explaining a conventional problem in detail.

The conventional problem will be explained in more detail with reference to FIG. 11. In a network shown in FIG. 11, a first switching unit 501₁ receives video data 503 as an ATM cell from a video distribution device 502 which distributes images. The first switching unit 501₁ transfers the video data 503 to a second switching unit 501₂ via a line 504. A video reproduction device 505 is connected to the second switching unit 501₂, and receives and reproduces video data 506 from the second switching unit 501₂.

Assume that the first switching unit 501₁ receives a clock from the video distribution device 502 and supplies a completely synchronized clock to the second switching unit 501₂. If the second switching unit 501₂ also supplies the video data 506 to the video reproduction device 505 in complete synchronism with the clock, the video reproduction device 505 can reproduce a synchronized image even upon occurrence of a "temporal fluctuation" in the clock in the video distribution device 502.

If, however, any fault occurs in clock transmission and another clock is supplied to the second switching unit 501₂ or video reproduction device 505, the clock is not identical to that used in the video distribution device 502. A shift from a clock which should be originally used to reproduce video data inevitably occurs. The video reproduction device 505 cannot reproduce a synchronized image.

SUMMARY OF THE INVENTION

It is an object of the present invention to provide a synchronous clock supply system and synchronous clock supply method in which a node that cannot receive a synchronous clock from a clock supply source can autonomously receive a clock from the clock supply source.

To achieve the above object, according to the present invention, there is provided a synchronous clock supply system comprising at least one relay node which is positioned in a clock supply route formed by coupling arbitrary virtual paths for nodes in a network, and a termination node which is positioned in a downstream side of the clock supply route farther than the relay node from a synchronous clock sending source used to synchronize the nodes in the network, and finally receives the synchronous clock via a predetermined port, the relay node having fault detection means for, when no synchronous clock is supplied in a downstream direction from an upstream side of the clock supply route due to a fault in the virtual path, detecting that no synchronous clock is supplied, fault notification data transmission means for, when the fault detection means detects the fault, sending fault notification data representing occurrence of the fault to the downstream side of the clock supply route, and first port switching means for, when switching instruction data designating switching to another port for supply of the synchronous clock is sent in the upstream side from the downstream side of the clock supply route, switching a port for receiving the synchronous clock to the port, and the termination node having second port switching means for, when another port is connected to the sending source via another virtual path and the fault notification data is sent from the relay node, performing port switching for supplying the synchronous clock from the predetermined port to another port, and port switching instruction means for, when the port switching means performs port switching, sending switching instruction data which instructs the upstream side of the clock supply route to switch the port to another port for supply of the synchronous clock.

DESCRIPTION OF THE PREFERRED EMBODIMENTS

The present invention will be described in detail by the following embodiments.

Figure 1:
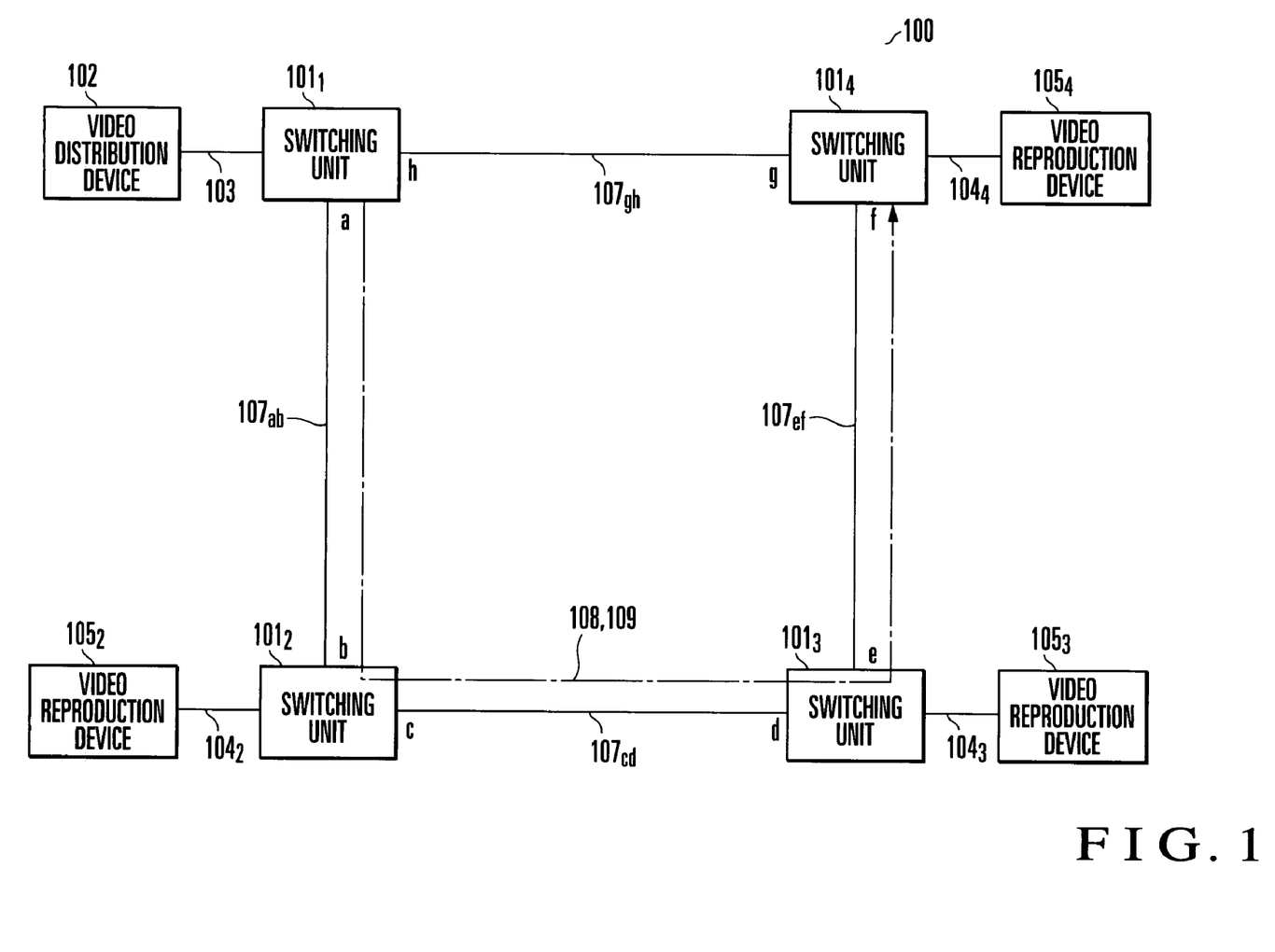
FIG. 1 is a block diagram showing the configuration of a synchronous clock supply system according to the first embodiment of the present invention.

As shown in FIG. 1, a synchronous clock supply system 100 according to the first embodiment of the present invention comprises first to fourth switching units $101_1$ to $101_4$ as nodes. Of the switching units $101_1$ to $101_4$, the first switching unit $101_1$ is connected to a video distribution device 102 shown in FIG. 1 in order to allow the video distribution device 102 to supply video data 103 to several user terminals in a network. These user terminals do not directly concern the video data 103, and are not illustrated in FIG. 1. The second, third, and fourth switching units $101_2$, $101_3$, and $101_4$ are connected to video reproduction devices $105_2$, $105_3$, and $105_4$ which receive video data $104_2$, $104_3$, and $104_4$ as transferred data of the video data 103. The second to fourth switching units $101_2$ to $101_4$ are also connected to user terminals. These user terminals do not directly concern the video data 103 (104), and are not illustrated in FIG. 1.

The system 100 of the first embodiment gives attention to reproduction of the video data 103 sent from the device 102 by the user terminals (video reproduction devices $105_2$, $105_3$, and $105_4$) in synchronism with the clock of the device 102. In other words, the system 100 of the first embodiment is so constructed as to reproduce the video data 103 sent from the device 102.

The first to fourth switching units $101_1$ to $101_4$ are connected to a plurality of user terminals (not shown in FIG. 1), and exchange other data input/output to/from these user terminals. In general, these data contain asynchronous data at a high rate. The system 100 shown in FIG. 1 can assume that synchronous data other than the video data 103 sent from the device 102 flow as ATM cells through a network. However, the first embodiment particularly gives attention to the video data 103 of the device 102. The system is so constructed as to reproduce the transferred video data $104_2$, $104_3$, and $104_4$ by the video reproduction devices $105_2$, $105_3$, and $105_4$ without any step-out. Various settings are done for this purpose.

In the system 100, the first to fourth switching units $101_1$ to $101_4$ function as a transit network for application data of a synchronous system between user terminals such as the device 102 and video reproduction devices $105_2$, $105_3$, and $105_4$. That is, the first to fourth switching units $101_1$ to $101_4$ function as ATM cell switching points which store application data of a synchronous system.

Two clock supply ports (a and h), (b and c), (d and e), or (f and g) shown in FIG. 1 are assigned to each of the first, second, third, and fourth switching units $101_1$, $101_2$, $101_3$, and $101_4$ in order to supply clocks. Clock supply lines $107_{ab}$, $107_{cd}$, $107_{ef}$, and $107_{gh}$ are connected to adjacent clock supply port pairs (a and b), (c and d), (e and f), and (g and h) so as to connect the four switching units $101_1$ to $101_4$ to a closed loop.

In the first embodiment, the first switching unit $101_1$ connected to the device 102 serves as a clock supply source. A clock supply route 108 for supplying a clock to the second to fourth switching units $101_2$ to $101_4$ is set from the first switching unit $101_1$ as a start point. In the route 108, the line $107_{ab}$ is used as a path from the first switching unit $101_1$ to the second switching unit $101_2$. The line $107_{cd}$ is used as a path from the second switching unit $101_2$ to the third switching unit $101_3$. The line $107_{ef}$ is used as a path from the third switching unit $101_3$ to the fourth switching unit $101_4$.

Further, a clock synchronization switching OAM connection 109 is set in the same direction as a direction in which a clock is supplied in the route 108. OAM (Operation Administration and Maintenance) determines the mechanism of ATM maintenance, operation, and administration.

The OAM connection 109 detects a fault in the connection and makes a notification about the fault by using two alarm transfer cells, i.e., AIS (Alarm Indication Signal) cell and RDI (Remote Defect Indication) cell. The AIS and RDI cells are OAM cells. The switching unit 101 (second switching unit $101_2$ in the first embodiment) serving as a node which detects a fault in the OAM connection 109 sends an AIS cell to the fourth switching unit $101_4$ serving as a node at the termination point of the connection. The fourth switching unit $101_4$ which serves as a node at the termination point of the OAM connection 109 and has received the AIS cell transmits an RDI cell to the OAM connection 109. The AIS and RDI cells have conventionally been used for fault detection. In the first embodiment, while the first switching unit $101_1$ is held as a clock supply source, clocks can be supplied from the first switching unit $101_1$ to the second to fourth switching units $101_2$ to $101_4$ by using another path.

The schematic circuit configuration of the first switching unit will be explained with reference to FIG. 2. The second to fourth switching units $101_2$ to $101_4$ basically have the same configuration as that of the first switching unit $101_1$, and an illustration and description thereof will be omitted. The first switching unit $101_1$ comprises a control unit 111 having a CPU (Central Processing Unit: not shown) and a memory which stores a control program.

The control unit 111 monitors a fault in a line connected to an upstream switching unit 101 in accordance with an OAM protocol. If necessary, the control unit 111 executes clock supply line change processing (to be described later). The control unit 111 is connected to an input line unit 113 which externally receives an ATM cell, an ATM switch 114, and an output line unit 115 which externally outputs an ATM cell. The control unit 111 is also connected to a clock supply line priority table 117 used to switch a clock supply port in accordance with the priority, and to a line master unit 118.

The control unit 111 comprises a fault detection unit 111a, fault notification data transmission unit 111b, port switching unit 111c, and port switching instruction unit 111d. The fault detection unit 111a performs processing in step S201 of FIG. 5. The fault notification data transmission unit 111b performs processing in step S202 of FIG. 5 or step S222 of FIG. 6. The port switching unit 111c performs processing in step S244 of FIG. 7 or step S262 of FIG. 8. The port switching instruction unit 111d performs processing in step S245 of FIG. 7.

The line master unit 118 receives a reference clock 121 sent from a clock generation source 119 via a clock input circuit 120. The line master unit 118 also receives each clock 123 from the device 102 via a corresponding clock input circuit 124. Also when clocks are sent from user terminals (not shown), the clocks are input to the line master unit 118 via corresponding clock input circuits (gate may be connected to an unused user terminal). The clock input circuit 124 extracts a clock from the frequency of an input signal (including optical data). When the line master unit 118 determines that the extracted clock is a master (reference) clock, the clock input circuit 124 supplies the clock to the line master unit 118. When the line master unit 118 determines that a user terminal such as the device 102 does not supply any reference clock, the clock input circuit 120 connected to the clock generation source 119 supplies a clock supplied from the clock generation source 119 prepared in the switching unit 101 as a master (reference) clock to the line master unit 118. The line master unit 118 alternatively turns on (connects) one of the clock input circuit 120 and clock input circuits 124, and turns off (disconnects) the remaining gates. Control of turning on one of the clock input circuit 120 and clock input circuits 124 and turning off the remaining circuits is set in advance by the operation manager of the clock supply system 100 in, e.g., designing the system. In the first embodiment, the video data 103 is distributed in synchronism with, i.e., in frequency proportion to the clock 123 used by the device 102. A setting of turning on the clock input circuit 124 is made before the start of operating the system.

The clock 123 selected by the line master unit 118 is supplied to the control unit 111, and the control unit 111 supplies the clock 123 to respective units in the first switching unit $101_1$. The control unit 111 controls the flow rate (frequency), per unit time (period or cycle), of a signal output from the output line unit 115 in synchronism with (in frequency proportion to) the supplied clock 123. For example, the first switching unit $101_1$ receives from the device 102 the video data 103 synchronized with a predetermined clock frequency. The first switching unit $101_1$ does not output any special clock signal from the output line unit 115, but sends, e.g., ATM cells in proportion to the clock frequency per unit time.

Figure 2:
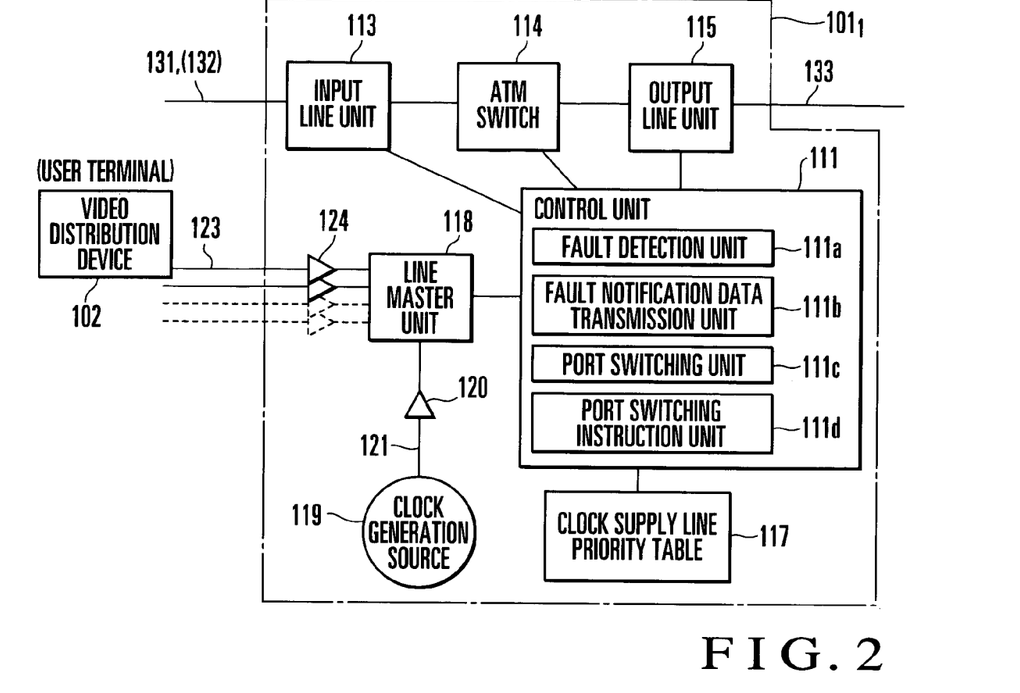
FIG. 2 is a block diagram showing the schematic circuit configuration of the first switching unit according to the first embodiment.
Figure 3A:
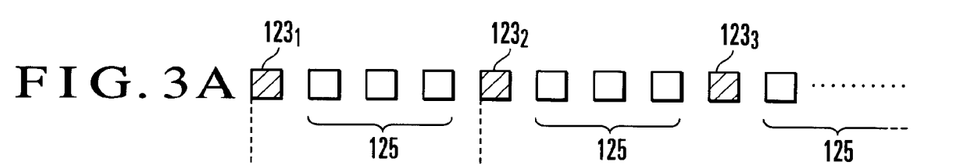
FIG. 3A is a view showing an example of the relationship between an ATM cell and a clock which are output from the first switching unit according to the first embodiment.
Figures 3B, 4:
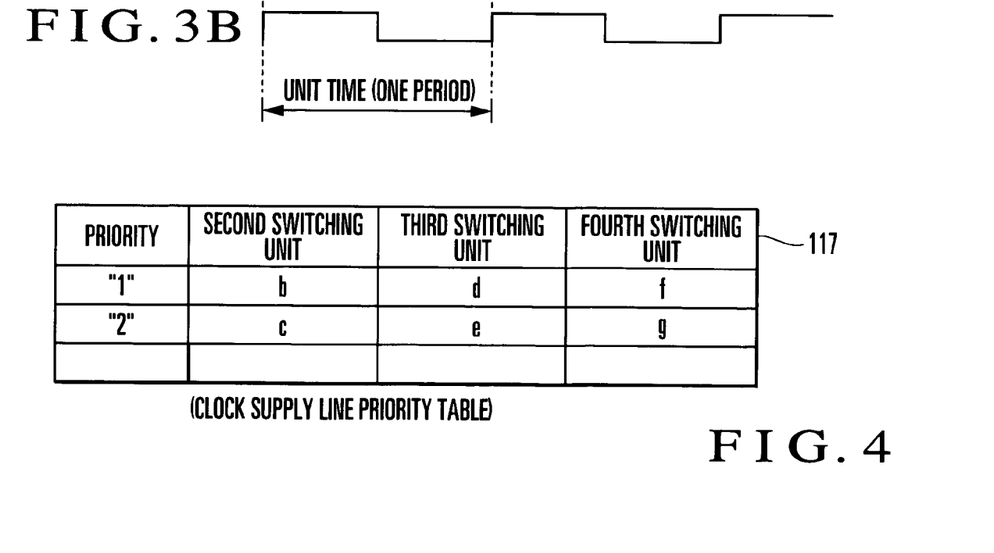
FIG. 3B is a timing chart showing the example of the relationship between an ATM cell and a clock which are output from the first switching unit according to the first embodiment.
FIG. 4 is a table showing a clock supply line priority table stored in the first switching unit according to the first embodiment.

Assume that hatched ATM cells in FIG. 3A are clock signals $123_1$, $123_2$, ... serving as ATM cells of the video data 103 output from the device 102. The clock input circuit 124 shown in FIG. 2 extracts a reference clock in the device 102 on the basis of the clock signals $123_1$, $123_2$, ... (FIG. 3B). The line master unit 118 adds other ATM cells 125 so as to achieve a flow rate of, e.g., four cells per unit time (period or cycle), and sends the resultant ATM cells to the next switching unit. The ATM cell 125 is an ATM cell which transfers information other than an image sent from another user terminal or the device 102 in FIG. 2. The ATM cell 125 may be a dummy ATM cell.

If the frequency of the clock signals $123_1$, $123_2$, ... serving as ATM cells of the video data 103 from the device 102 temporarily varies, the frequency of the internal clock of the first switching unit $101_1$ also varies in accordance with the variation. The traffic of ATM cells sent from the first switching unit $101_1$ to the next switching unit also varies in accordance with the variation. As a result, another switching unit can also correctly reproduce the video data 103 on the basis of a master clock reproduced from ATM cells sent from the first switching unit $101_1$.

The system 100 of the first embodiment requires a setting in which only one of the first to fourth switching units $101_1$ to $101_4$ shown in FIG. 1 serves as a master for outputting a reference clock and the remaining switching units serve as slaves. The line master units 118 of the switching units $101_1$ to $101_4$ are set by the system operator in advance so as to meet this requirement. In the first embodiment, the line master unit 118 of the first switching unit $101_1$ serves as a clock master, and the line master units 118 of the second to fourth switching units $101_2$ to $101_4$ serve as clock slaves.

The input line unit 113 receives an ATM cell 131 which stores application data of a synchronous system. Based on a signal representing an instruction from the control unit 111, the input line unit 113 performs processes such as termination of a connection, monitoring of the flow rate of the ATM cell 131, header conversion of the ATM cell 131, performance monitoring including a fault, and reassembly/segmentation of the ATM cell 131. When the input line unit 113 receives an OAM cell 132 which forms part of an ATM cell, the input line unit 113 supplies a content stored in the cell to the control unit 111. The input line unit 113 and output line unit 115 also perform processing of detecting a line fault. When the input line unit 113 or output line unit 115 detects a line fault, the unit 113 or 115 supplies the fault content to the control unit 111.

The ATM switch 114 executes swithing of an ATM cell input from the input line unit 113. The output line unit 115 sends the ATM cell received from the ATM switch 114 to a predetermined connection via an output line 133. The output line unit 115 monitors a fault in accordance with a signal representing an instruction from the control unit 111, and if necessary, generates an OAM cell. The generated OAM cell is sent to the OAM connection 109.

As shown in FIG. 4, the table 117 stored in each of the second to fourth switching units stores a connection at which an OAM cell is detected and a changed clock supply port in correspondence with the priority. In the first embodiment, the first switching unit $101_1$ serves as a clock supply source, and the table 117 of the first switching unit $101_1$ does not store data on a changed clock supply port and a connection at which an OAM cell is detected.

When a fault occurs in one of the lines $107_{ab}$, $107_{cd}$, $107_{ef}$, and $107_{gh}$ shown in FIG. 1 that is currently used by each of the second to fourth switching units $101_2$ to $101_4$, or when the switching unit is positioned at the termination of the OAM connection 109 and receives an AIS cell, the lines $107_{ab}$, $107_{cd}$, $107_{ef}$ and $107_{gh}$ are switched by looking up the prepared table 117 (contents describing the switching unit in FIG. 4). In the first embodiment, two priorities (priority order), i.e., first priority "1" and second priority "2" are determined for switching. The contents of the table 117 are set in advance by the system operator in constructing the system 100 of the first embodiment or changing the system. If the first switching unit $101_1$ loses the master position as a clock supply source and changes to a slave, data on the connection and changed clock supply port of the first switching unit $101_1$ are stored in the table 117.

The operation of the system 100 according to the first embodiment will be exemplified. In this example, a signal (to be simply referred to as a synchronous clock hereinafter) corresponding to a flow rate (frequency) per unit time that represents clocks in the device 102 is supplied from the first switching unit $101_1$ shown in FIG. 1 to the second to fourth switching units $101_2$ to $101_4$ at the clock supply ports (b, d, and f) having the priority "1" in the table 117 of FIG. 4. Since the synchronous clock is extracted from the frequency component of a signal (including optical data), the synchronous clock contains an AIS-containing OAM cell and RDI-containing OAM cell in addition to an ATM cell representing general data.

The first switching unit $101_1$ outputs a synchronous clock received from either the clock generation source 119 or device 102 shown in FIG. 2 from the clock supply port a to the line $107_{ab}$. In this example, the clock input circuit is turned on to select the clock 123 sent from the device 102 and output the clock 123 from the clock supply port a to the line $107_{ab}$. The second to fourth switching units $101_2$ to $101_4$ receive the synchronous clock via the route 108, and perform various operations in synchronism with the synchronous clock. The reference clock 121 output from the clock generation source 119 is used when a synchronous clock need not be sent by using a clock from a user terminal as a reference, or when no reference clock is supplied from the upstream side.

Assume that a fault occurs in the line $107_{ab}$ which connects the first and second switching units $101_1$ and $101_2$ at given time. In this case, no synchronous clock is supplied from the first switching unit $101_1$ to the second switching unit $101_2$. Thus, the input line unit 113 shown in FIG. 2 in the second switching unit $101_2$ detects a fault at the clock supply port b.

Figure 5:
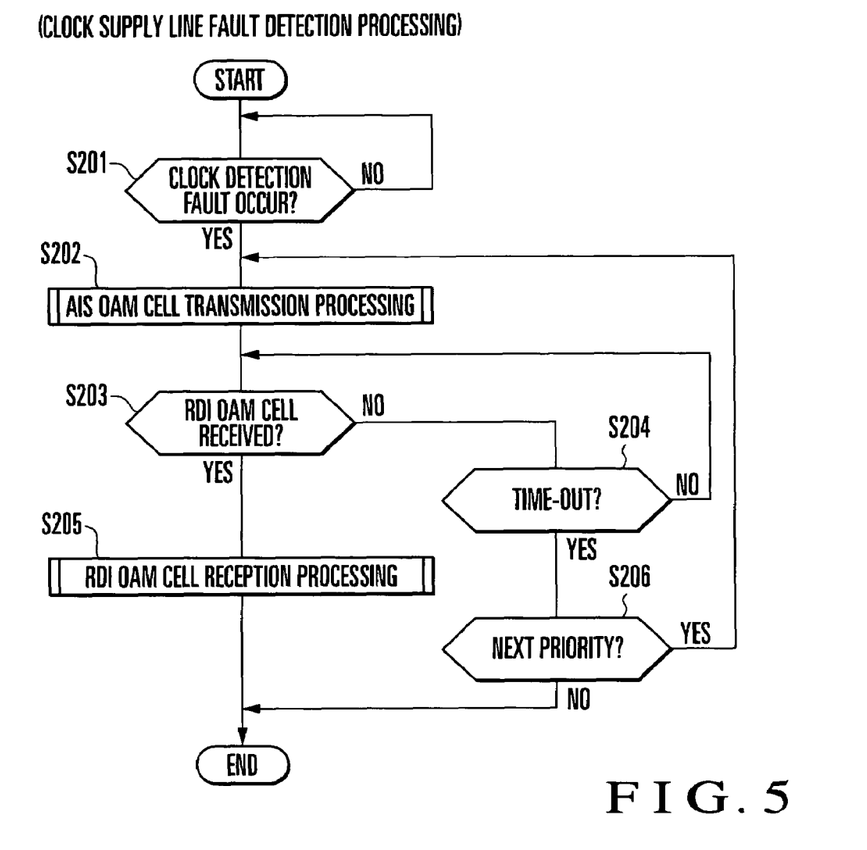
FIG. 5 is a flow chart showing processing by the second switching unit when a clock supply port detects a fault according to the first embodiment.

As shown in FIG. 5, if the control unit 111 of the second switching unit $101_2$ detects a fault at the clock supply port b (step S201: Y), the control unit 111 executes transmission processing of an AIS-containing OAM cell (step S202). The control unit 111 of the second switching unit $101_2$ waits for reception of an RDI-containing OAM cell (step S203).

Figure 6:
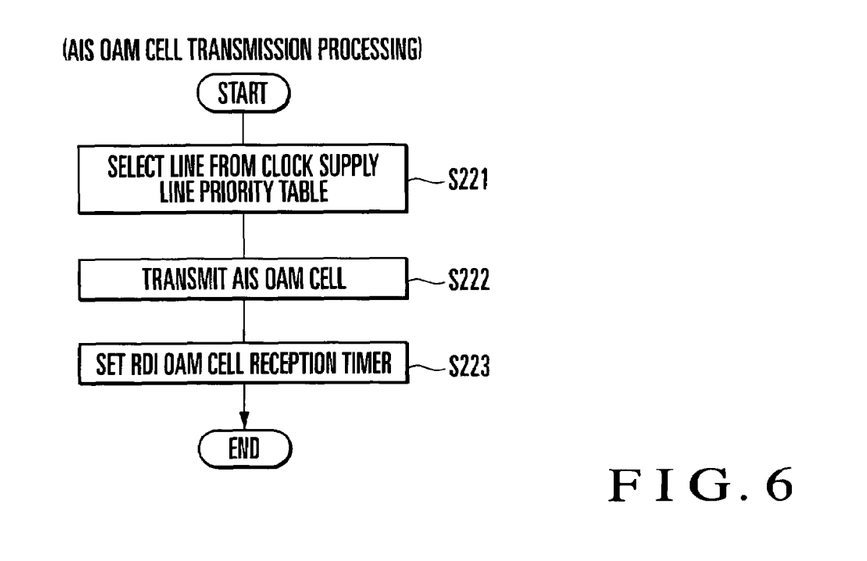
FIG. 6 is a flow chart showing in detail OAM cell transmission processing by the second switching unit according to the first embodiment.

As shown in FIG. 6, in OAM cell transmission processing by the second switching unit $101_2$, a line connected to the clock supply port c having the priority "2" subsequent to the priority "1" in the table 117 shown in FIG. 4 is selected (step S221). As shown in FIG. 1, the line $107_{cd}$ is selected. The control unit 111 generates an AIS-containing OAM cell to the OAM connection 109 set in the selected line $107_{cd}$, and transmits the OAM cell via the output line unit 115 (step S222). A timer for waiting for reception of an RDI-containing OAM cell at the OAM connection 109 is set (step S223), and OAM cell transmission processing ends (END).

A clock used by the second switching unit $101_2$ at this time will be explained. As described above, the second switching unit $101_2$ does not receive a synchronous clock from the first switching unit $101_1$ due to a fault in the line $107_{ab}$. That is, no ATM cell is supplied from the first switching unit $101_1$. At this time, the line master unit 118 in the second switching unit $101_2$ turns on the clock input circuit 120 (see FIG. 2), and supplies the reference clock 121 to the control unit 111. Since no video data 103 arrives from the device 102 shown in FIG. 1, an AIS-containing OAM cell is added to an ATM cell processed by another user terminal (not shown), and the resultant cell is sent to the line $107_{cd}$.

The AIS-containing OAM cell transmitted from the second switching unit $101_2$ in step S222 of FIG. 6 is input from the input line unit 113 of the third switching unit $101_3$ at the OAM connection 109, and supplied to the control unit 111. Since the third switching unit $101_3$ is not the termination of the OAM connection 109, the AIS-containing OAM cell is directly supplied to the output line unit 115. The output line unit 115 transfers the OAM cell to the fourth switching unit $101_4$ at the termination of the OAM connection 109.

The second and third switching units $101_2$ and $101_3$ do not receive a synchronous clock which should be originally supplied from the first switching unit $101_1$. The third switching unit $101_3$ extracts a clock from the frequency of a signal sent from the second switching unit $101_2$. While the third switching unit $101_3$ processes the clock as a synchronous clock having a unit time as a period, the unit $101_3$ transfers an AIS-containing OAM cell to the fourth switching unit $101_4$ at the termination.

Figure 7:
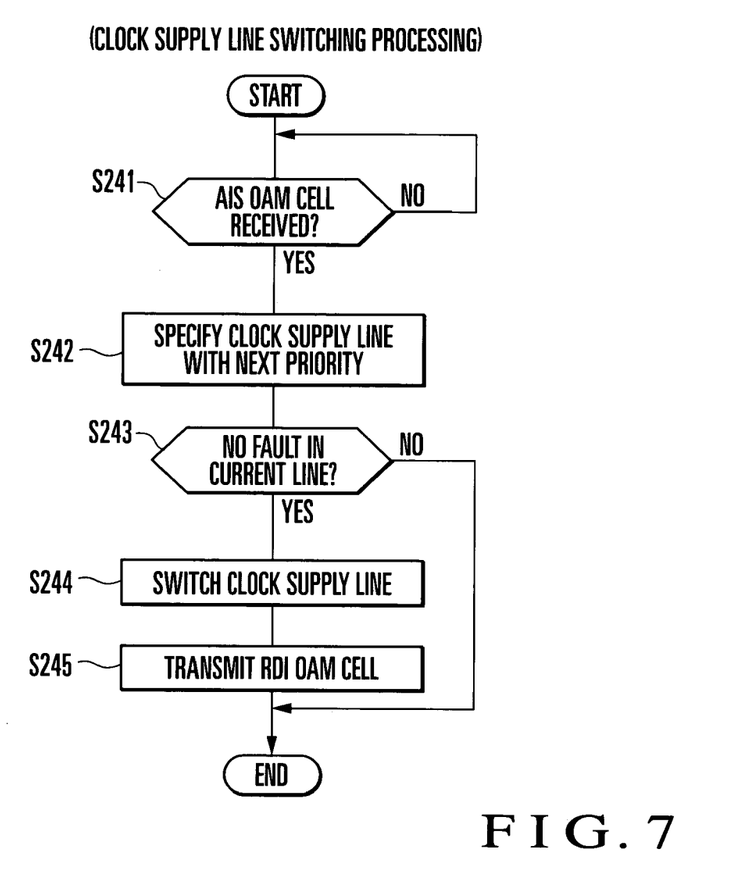
FIG. 7 is a flow chart showing the contents of clock supply line switching processing performed by the fourth switching unit according to the first embodiment.

As shown in FIG. 7, if the fourth switching unit $101_4$ detects an AIS-containing OAM cell at the OAM connection 109 that is input to the input line unit 113 (step S241: Y), the unit $101_4$ specifies a line having the priority "2" subsequent to the current priority "1" in the table 117 shown in FIG. 4 (step S242). The control unit 111 of the fourth switching unit $101_4$ uses the input line unit 113 to check whether a fault has occurred in the line $107_{gh}$ connected to the clock supply port g (step S243). If no fault has occurred (Y), the control unit 111 notifies the line master unit 118 of the line $107_{gh}$ as a line for newly supplying a synchronous clock, and switches the line (step S244). The control unit 111 sends back an RDI-containing OAM cell to the OAM connection 109 (step S245).

If a fault is determined in step S243 to have occurred in the line $107_{gh}$, the fourth switching unit $101_4$ cannot receive any synchronous clock from the first switching unit $101_1$ even by switching. In this case, processing ends without setting switching of the clock supply line in the line master unit 118 and sending back an RDI-containing OAM cell to the OAM connection 109 (END).

If the fourth switching unit $101_4$ sends back the RDI-containing OAM cell to the OAM connection 109, the third and second switching units $101_3$ and $101_2$ sequentially receive the RDI-containing OAM cell.

Figure 8:
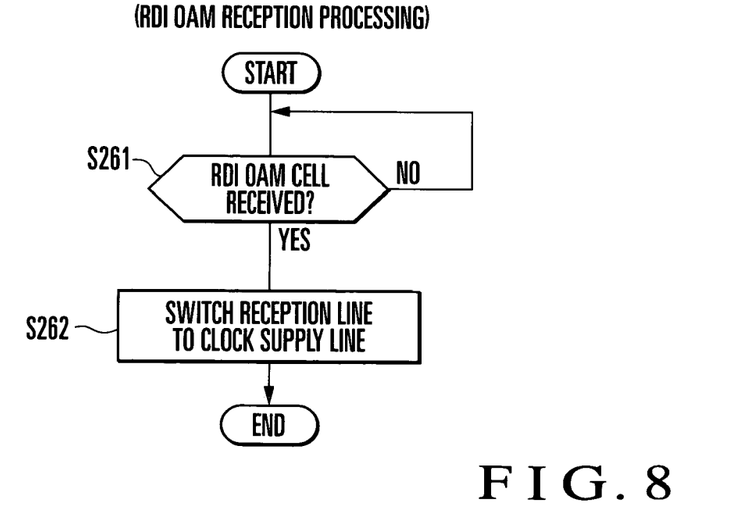
FIG. 8 is a flow chart showing the contents of processing when the third switching unit receives an RDI-containing OAM cell according to the first embodiment.

As shown in FIG. 8, if the third switching unit $101_3$ receives the RDI-containing OAM cell from the fourth switching unit $101_4$ at the termination (step S261: Y), the unit $101_3$ switches the line $107_{ef}$ connected to the clock supply port e which has received the cell, to the clock supply line (step S262), and ends reception processing (END).

As shown in FIG. 5, the control unit 111 of the second switching unit $101_2$ executes transmission processing of an AIS-containing OAM cell upon detecting a fault at the clock supply port b. After that, the control unit 111 waits for reception of an RDI-containing OAM cell. In this state, if the control unit 111 receives an RDI-containing OAM cell before the time-out of the timer for waiting for reception of an RDI-containing OAM cell, as shown in FIG. 6 (step S203 of FIG. 5: Y), the control unit 111 performs the same RDI-containing OAM cell reception processing as that shown in FIG. 8 (step S205). Accordingly, clock supply line switching processing of the second switching unit $101_2$ upon detecting a fault at the clock supply port ends (END).

If the time-out of the timer for waiting for reception of an RDI-containing OAM cell occurs in step S204 (Y), no response has been received for AIS-containing OAM cell transmission processing executed upon occurrence of a fault. In this case, whether a clock supply port having the next priority exists in the table 117 shown in FIG. 4 is determined (step S206). If a clock supply port having the next priority exists (Y), processing shown in FIG. 6 using a clock supply line connected to the clock supply port having this priority is performed. In this processing, the current priority "2" in the table 117 shown in FIG. 4 is changed to the next priority "3" (not shown). A clock supply line connected to the new clock supply port is specified instead of the line $107_{cd}$ connected to the current clock supply port c (step S221 of FIG. 6). An AIS-containing OAM cell is generated for a clocked switching OAM connection set in the specified line, and transmitted via the output line unit 115 (step S222).

In the first embodiment, no priority is set subsequent to the current priority "2" in the table 117 shown in FIG. 4 (step S206: N). Since no clock supply line serving as a switching destination exists, switching operation ends (END). In the final example, switching is not finally completed, and the first switching unit $101_1$ cannot function as a clock supply source.

In the first embodiment described above, when the OAM connection 109 is set in an ATM network and a fault occurs in a clock supply path, an AIS-containing OAM cell is supplied to a downstream switching unit 101. A switching unit (fourth switching unit $101_4$ in the first embodiment) as the termination of the clocked switching OAM connection 109 selects a clock supply switchable line. The switching unit sends back an RDI-containing OAM cell to the OAM connection 109, and notifies an upstream switching unit (second switching unit $101_2$ in the first embodiment) that the clock supply line can be switched. This can prevent disconnection of a switching unit 101 from the clocked network owing to a fault in a downstream clock supply line upon switching the clock supply line, unlike the prior art. Consequently, the clocked network of the ATM network including the downstream switching unit 101 can be reconfigured.

Figure 9:
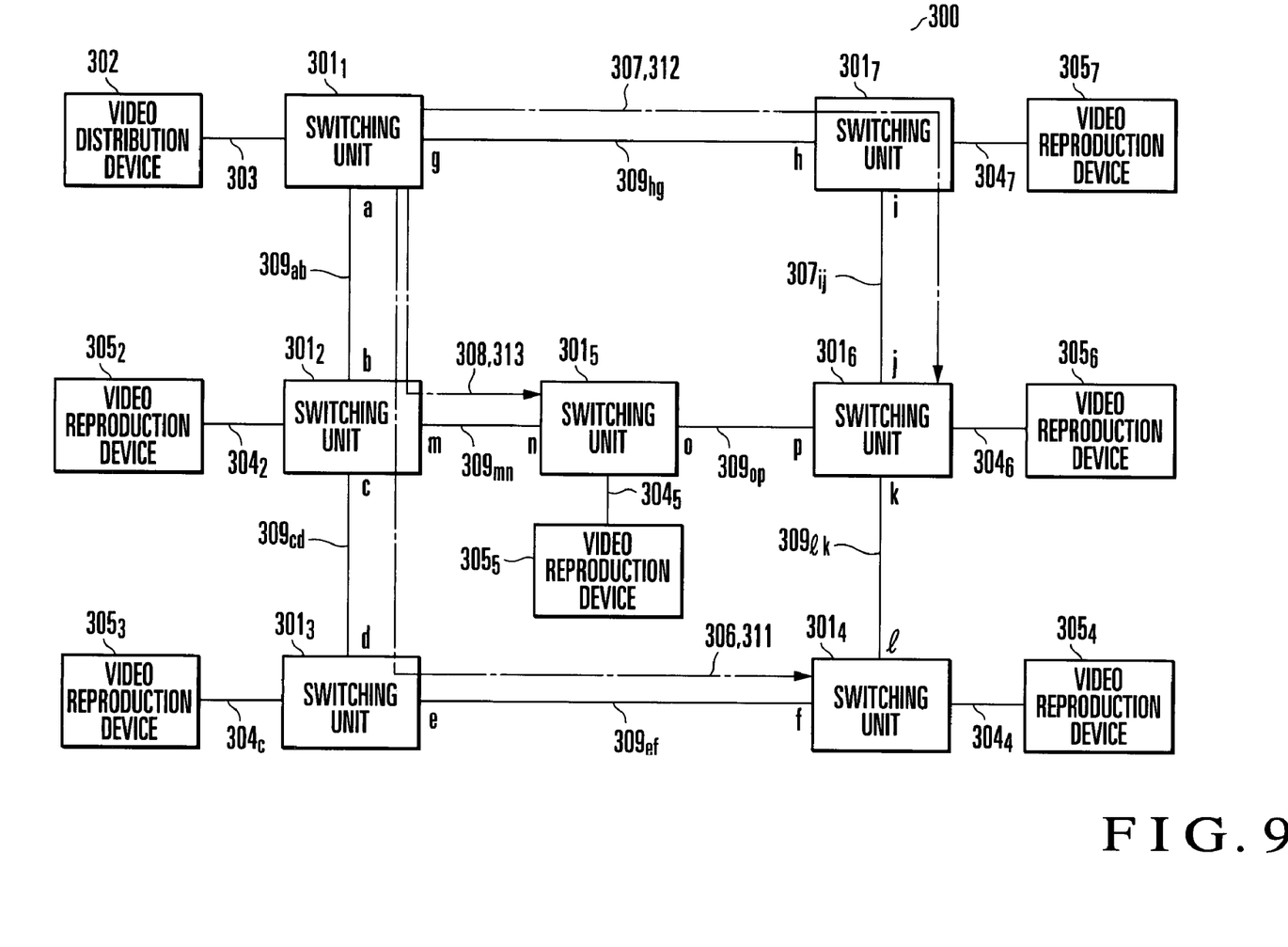
FIG. 9 is a block diagram showing the configuration of a synchronous clock supply system according to the second embodiment of the present invention.

A synchronous clock supply system according to the second embodiment of the present invention will be described. As shown in FIG. 9, a synchronous clock supply system 300 according to the second embodiment comprises first to seventh switching units $301_1$ to $301_7$ as nodes. Of the switching units $301_1$ to $301_7$, the first switching unit $301_1$ is connected to a video distribution device 302 shown in FIG. 9 in order to allow the video distribution device 302 to supply video data 303 to several user terminals in a network. These user terminals do not directly concern the video data 303, and are not illustrated in FIG. 9. The second to seventh switching units $301_2$ to $301_7$ are connected to video reproduction devices $305_2$ to $305_7$ which receive video data $304_2$ to $304_7$ as transferred data of the video data 303. The second to seventh switching units $301_2$ to $301_7$ are also connected to user terminals. These user terminals do not directly concern the video data 303 (304), and are not illustrated in FIG. 9.

The synchronous clock supply system 300 of the second embodiment gives attention to reproduction of the video data 303 sent from the video distribution device 302 by the user terminals (video reproduction devices $305_2$ to $305_7$) in synchronism with the clock of the video distribution device 302. In other words, the synchronous clock supply system 300 of the second embodiment is so constructed as to reproduce the video data 303 sent from the video distribution device 302.

The first to seventh switching units $301_1$ to $301_7$ are connected to a plurality of user terminals (not shown in FIG. 9), and exchange other data input/output to/from these user terminals. In general, these data contain asynchronous data at a high rate. Asynchronous data need not be reproduced in real time by using a temporal reference "clock". The synchronous clock supply system 300 shown in FIG. 9 can assume that synchronous data other than the video data 303 sent from the video distribution device 302 flow as ATM cells through a network. However, the second embodiment particularly gives attention to the video data 303 of the video distribution device 302. The system is so constructed as to reproduce the transferred video data $304_2$ to $304_7$ by the video reproduction devices $305_2$ to $305_7$ without any step-out. Various settings are done for this purpose.

The synchronous clock supply system 300 functions as a transit network for application data of a synchronous system between user terminals. That is, the first to seventh switching units $301_1$ to $301_7$ function as ATM cell switching points which store application data of a synchronous system.

In the second embodiment, a plurality of clock supply lines exist in an ATM network which constitutes the synchronous clock supply system 300. A clock supply line $309_{ab}$ is connected between a clock supply port a of the first switching unit $301_1$ and a clock supply port b of the second switching unit $301_2$. A clock supply line $309_{cd}$ is connected between a clock supply port c of the second switching unit $301_2$ and a clock supply port d of the third switching unit $301_3$. Similarly, the first to seventh switching units $301_1$ to $301_7$ comprise clock supply ports (a and g), (b, c, and m), (d and e), (f and l), (n and o), (p, k, and j), and (h and i). Clock supply lines 309 with suffixes of alphabetic combinations representing facing clock supply ports as shown in FIG. 9 are connected between the clock supply ports.

In the synchronous clock supply system 300, the first switching unit $301_1$ which receives the video data 303 from the video distribution device 302 serves as a clock supply source. First to third clock supply routes 306 to 308 are set as synchronous clock supply routes by using the first switching unit $301_1$ as a start point. In the first clock supply route 306, the clock supply port of the second switching unit $301_2$ is the port b, that of the third switching unit $301_3$ is the port d, and that of the fourth switching unit $301_4$ is the port f. In the second clock supply route 307, the clock supply port of the seventh switching unit $301_7$ is the port h, and that of the sixth switching unit $301_6$ is the port j. In the third clock supply route 308, the clock supply port of the second switching unit $301_2$ is the port b which is also adopted in the first clock supply route 306, and that of the fifth switching unit $301_5$ is the port n.

First to third clock synchronization switching OAM connections 311 to 313 are set in the same directions as the first to third clock supply routes 306 to 308. More specifically, the first connection 311 which sequentially reaches the second switching unit $301_2$, third switching unit $301_3$, and fourth switching unit $301_4$ is set from the first switching unit $301_1$ serving as a start point. The second connection 312 which sequentially reaches the seventh switching unit $301_7$ and sixth switching unit $301_6$ is similarly set from the first switching unit $301_1$ serving as a start point. The third connection 313 which sequentially reaches the second switching unit $301_2$ and fifth switching unit $301_5$ is similarly set from the first switching unit $301_1$ serving as a start point.

The circuit configurations of the first to seventh switching units $301_1$ to $301_7$ are basically the same as that of the first switching unit $101_1$ described in the first embodiment with reference to FIG. 2 except a clock supply line priority table (to be described later). A description of the circuit configurations of the first to seventh switching units $301_1$ to $301_7$ will be omitted. A detailed circuit will be explained directly using reference numerals in FIG. 2 in principle.

Figure 10:
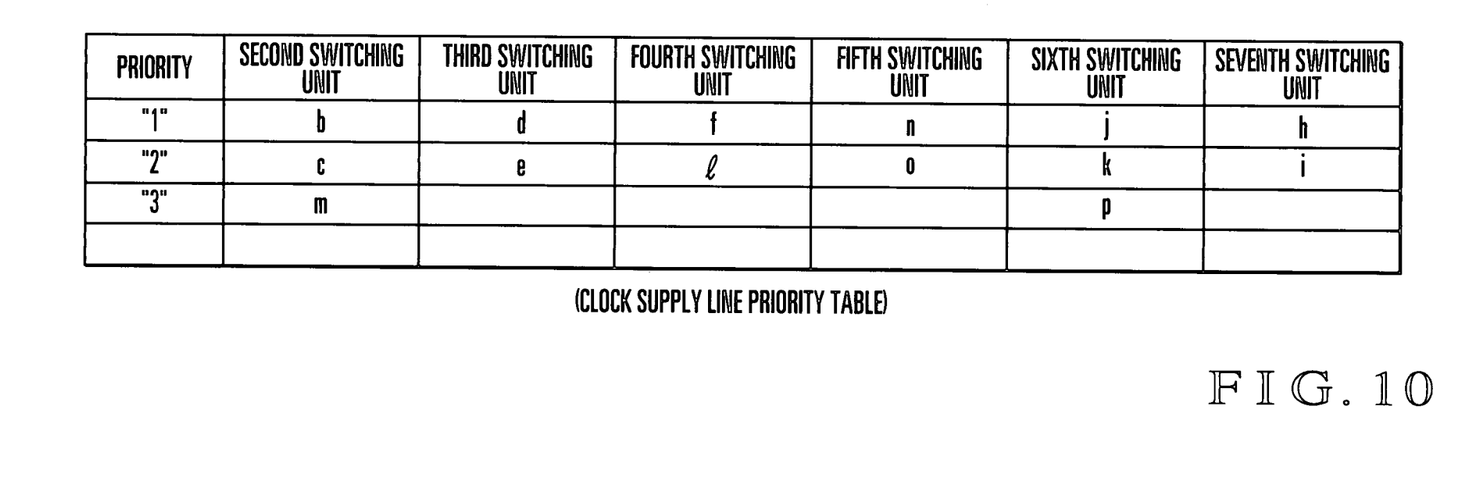
FIG. 10 is a table showing a clock supply line priority table stored in the first switching unit according to the second embodiment.

FIG. 10 shows a clock supply line priority table stored in each of the second to seventh switching units. A clock supply line priority table 317 stores a connection at which an OAM cell is detected and a changed clock supply port in correspondence with the priority. Also in the second embodiment, the first switching unit $301_1$ serves as a clock supply source, and the clock supply line priority table 317 of the first switching unit $301_1$ does not store data on a connection at which an OAM cell is detected and a changed clock supply port.

When a fault occurs in one of the clock supply lines $309_{ab}$, $309_{cd}$, $309_{ef}$, $309_{gh}$, . . . shown in FIG. 9 that is currently used by each of the second to seventh switching units $301_2$ to $301_7$, or when the switching unit is positioned at the termination of any one of the OAM connections 311 to 313 and receives an AIS cell, a corresponding one of the clock supply lines $309_{ab}$, $309_{cd}$, $309_{ef}$, $309_{gh}$, . . . is switched by looking up the prepared clock supply line priority table 317 (contents describing the switching unit in FIG. 10). In the second embodiment, three priorities (priority order), i.e., first priority "1" to third priority "3" are determined for switching. The contents of the clock supply line priority table 317 are set in advance by the system operator in constructing the synchronous clock supply system 300 of the second embodiment or changing the system. If the first switching unit $301_1$ loses the master position as a clock supply source and changes to a slave, data on the connection and changed clock supply port of the first switching unit $301_1$ are stored in the clock supply line priority table 317.

The operation of the synchronous clock supply system according to the second embodiment will be exemplified. In this example, a signal (synchronous clock) corresponding to a flow rate (frequency) per unit time that represents clocks in the video distribution device 302 is supplied from the first switching unit $301_1$ shown in FIG. 9 to the second to seventh switching units $301_2$ to $301_7$ at the clock supply ports (b, d, and f), (h and j), and (b and n) having the priority "1" in the clock supply line priority table 317 of FIG. 10. Since the synchronous clock is extracted from the frequency component of a signal (including optical data), the synchronous clock contains an AIS-containing OAM cell and RDI-containing OAM cell in addition to an ATM cell representing general data.

The first switching unit $301_1$ outputs a synchronous clock received from either a clock generation source 119 shown in FIG. 2 or the video distribution device 302 shown in FIG. 9 from the two clock supply ports a and g to the clock supply lines $309_{ab}$ and $309_{hg}$. In this example, the clock input circuit is turned on to select a clock (corresponding to a clock 123 in FIG. 2) sent from the video distribution device 302 and output the clock from the clock supply ports a and g to the clock supply lines $309_{ab}$ and $309_{hg}$. The second to seventh switching units $301_2$ to $301_7$ receive the synchronous clock via the first to third clock supply routes 306 to 308, and perform various operations in synchronism with the synchronous clock.

Assume that a fault occurs in the clock supply line $309_{ab}$ which connects the first and second switching units $301_1$ and $301_2$. In this case, no synchronous clock is supplied to the second switching unit $301_2$. Thus, an input line unit 113 shown in FIG. 2 in the second switching unit $301_2$ detects a fault at the clock supply port b. In this case, a control unit 111 (see FIG. 2) of the second switching unit $301_2$ performs the same processing as processing of detecting a fault at a clock supply port in the first embodiment.

More specifically, if the control unit 111 of the second switching unit $301_2$ detects a fault at the clock supply port b (step S201: Y), the control unit 111 executes transmission processing of an AIS-containing OAM cell (step S202). The control unit 111 of the second switching unit $101_2$ waits for reception of an RDI-containing OAM cell (step S203). Processing in step S202 is substantially the same as that shown in FIG. 6 according to the first embodiment. More specifically, a line connected to the clock supply port c having the priority "2" subsequent to the priority "1" in the clock supply line priority table 317 shown in FIG. 10 is selected (step S221). As shown in FIG. 9, the clock supply line $309_{cd}$ is selected. The control unit 111 generates an AIS-containing OAM cell to the first connection 311 set in the selected clock supply line $309_{cd}$, and transmits the OAM cell via an output line unit 115 (step S222). A timer for waiting for reception of an RDI-containing OAM cell at the first connection 311 is set (step S223), and OAM cell transmission processing ends (END).

A clock used by the second switching unit $301_2$ at this time will be explained for only the first connection 311. As described above, the second switching unit $301_2$ does not receive a synchronous clock from the first switching unit $301_1$ due to a fault in the clock supply line $309_{ab}$. That is, no ATM cell is supplied from the first switching unit $301_1$. At this time, a line master unit 118 (see FIG. 2) in the second switching unit $301_2$ turns on a clock input circuit 120 (see FIG. 2), and supplies a reference clock 121 to the control unit 111. Since no video data 303 arrives from the video distribution device 302 shown in FIG. 9, an AIS-containing OAM cell is added to an ATM cell processed by another user terminal (not shown), and the resultant cell is sent to the clock supply line $309_{cd}$.

The AIS-containing OAM cell sent from the second switching unit $301_2$ is input from the input line unit 113 of the third switching unit $301_3$ at the first connection 311, and supplied to the control unit 111. Since the third switching unit $301_3$ is not the termination of the first connection 311, the AIS-containing OAM cell is directly supplied to the output line unit 115. The output line unit 115 transfers the OAM cell to the fourth switching unit $301_4$ at the termination of the first connection 311.

The contents of clock supply line switching processing executed in the fourth switching unit at the termination according to the second embodiment are substantially the same as those shown in FIG. 7 according to the first embodiment. More specifically, if the fourth switching unit $301_4$ detects an AIS-containing OAM cell at the first connection 311 that is input to the input line unit 113 (step S241: Y), the unit $301_4$ specifies a line having the priority "2" subsequent to the current priority "1" in the clock supply line priority table 317 shown in FIG. 10 (step S242). The control unit 111 of the fourth switching unit $301_4$ uses the input line unit 113 to check whether a fault has occurred in the clock supply line $309_{lk}$ connected to the clock supply port l (step S243). If no fault has occurred (Y), the control unit 111 notifies the line master unit 118 of the clock supply line $309_{lk}$ as a line for supplying a clock, and switches the line (step S244). The control unit 111 sends back an RDI-containing OAM cell to the first connection 311 (step S245).

If a fault is determined in step S243 to have occurred in the clock supply line $309_{lk}$, processing ends without setting switching of the clock supply line in the line master unit 118 and sending back an RDI-containing OAM cell to the first connection 311 (END).

If the fourth switching unit $3014$ sends back the RDI-containing OAM cell to the first connection 311, the third and second switching units $301_3$ and $301_2$ sequentially receive the RDI-containing OAM cell.

As described in the first embodiment, FIG. 8 similarly shows a processing flow when the third switching unit $301_3$ of the second embodiment receives an RDI-containing OAM cell. If the third switching unit $301_3$ receives the RDI-containing OAM cell from the fourth switching unit $301_4$ at the termination (step S261: Y), the unit $301_3$ switches the clock supply line $309_{ef}$ connected to the clock supply port e which has received the cell, to the clock supply line (step S262), and ends reception processing (END).

As shown in FIG. 5, the control unit 111 of the second switching unit $301_2$ executes transmission processing of an AIS-containing OAM cell upon detecting a fault at the clock supply port b. After that, the control unit 111 waits for reception of an RDI-containing OAM cell. In this state, if the control unit 111 receives an RDI-containing OAM cell before the time-out of the timer for waiting for reception of an RDI-containing OAM cell, as shown in FIG. 6 (step S203 of FIG. 5: Y), the control unit 111 performs the same RDI-containing OAM cell reception processing as that shown in FIG. 8 (step S205). As a result, clock supply line switching processing of the second switching unit $301_2$ upon detecting a fault at the clock supply port ends (END).

If the time-out of the timer for waiting for reception of an RDI-containing OAM cell occurs in step S204 (Y), no response has been received for AIS-containing OAM cell transmission processing executed upon occurrence of a fault. In this case, whether a clock supply port having the next priority exists in the clock supply line priority table 317 shown in FIG. 10 is determined (step S206). If a clock supply port having the next priority exists (Y), processing shown in FIG. 6 using a clock supply line connected to the clock supply port having this priority is performed. In this processing, the current priority "2" in the clock supply line priority table 317 shown in FIG. 10 is changed to the next priority "3". The clock supply line $309_{mn}$ connected to the new clock supply port m is specified instead of the line $309_{cd}$ connected to the current clock supply port c (step S221). An AIS-containing OAM cell is generated for the third connection 313 set in the specified line, and transmitted via the output line unit 115 (step S222).

In this case, the sent AIS-containing OAM cell reaches the fifth switching unit $301_5$ serving as the termination point of the third connection 313. If the fifth switching unit $301_5$ detects the AIS-containing OAM cell (step S241 of FIG. 7: Y), the unit $301_5$ specifies the clock supply line $309_{op}$ having the priority "2" subsequent to the current priority "1" in the table 317 shown in FIG. 10 (step S242). The control unit 111 of the fifth switching unit $301_5$ uses the input line unit 113 to check whether a fault has occurred in the clock supply line $309_{op}$ connected to the clock supply port o (step S243). If no fault has occurred (Y), the control unit 111 notifies the line master unit 118 of the clock supply line $309_{op}$ as a line for supplying a clock, and switches the line (step S244). The control unit 111 sends back an RDI-containing OAM cell to the third connection 313 (step S245).

The second switching unit $301_2$ which has received the RDI-containing OAM cell switches the current clock supply port b to the clock supply port m. Consequently, a series of clock supply line switching operations are completed.

In the first and second embodiments described above, the first switching unit $101_1$ or first switching unit $301_1$ supplies a synchronous clock to the remaining second to fourth switching units $101_2$ to $101_4$ or second to seventh switching units $301_2$ to $301_7$. However, the node which supplies the first synchronous clock need not be a switching unit because the node itself need not have an ATM cell switching function.

The first embodiment has exemplified the fourth switching unit $101_4$ as a node at the termination point of a connection. The second embodiment has exemplified the fourth, fifth, and seventh switching units $301_4$, $301_5$, and $301_7$ as nodes at the termination points of connections. However, the present invention is not limited to them. That is, a node at the termination point of a connection suffices to be a device which can be switched to a node for supplying the first synchronous clock to a port upon occurrence of a fault.

In the first and second embodiments, the port is switched in accordance with the priority (priority order). However, the port can be switched to one regardless of the priority (e.g., another port having the same priority). The synchronous clock suffices to be switched to a node which supplies the synchronous clock for the first time. For example, the node may be switched to a direction in which the priority increases on the basis of the line quality. In this case, lines whose quality is more than ones required for communication only upon occurrence of a fault are used to send ATM cells, and the quality is lowered to a practical level in a normal state.

The above embodiments have described video data transferred between the device 102 or 302 for distributing images as application data of a synchronous system and the video reproduction device 105 or 305 for reproducing distributed images. However, the present invention is not limited to this, and can be applied to application data of various synchronous systems.

As described above, according to the present invention, a synchronous clock supply system comprises a clock sending means for sending a synchronous clock used to synchronize communication devices in a network, one or a plurality of relay communication devices which relay the synchronous clock to a sending destination, and a termination communication device serving as the sending destination of the synchronous clock. The clock sending means sends a synchronous clock used to synchronize the communication devices in the network, to a clock supply route formed by coupling at least some of the communication devices via each path. The clock supply route extends to the termination communication device via the relay communication devices. The relay communication device comprises a fault detection means for, when no synchronous clock is supplied in a downstream direction due to a fault in an upstream path closer to the clock sending means, detecting this state. When the fault detection means detects a fault, a fault notification data transmission means sends fault notification data representing occurrence of the fault to the downstream side of the clock supply route. When the fault notification data reaches the termination communication device, a port switching means performs port switching for supplying the synchronous clock from a predetermined port to another port. Accordingly, the synchronous clock can be supplied from the clock sending means to the termination communication device via another route. At the same time, the port switching instruction means of the termination communication device sends switching instruction data which instructs the upstream side of the clock supply route to switch the port to another one for supply of the synchronous clock. When the switching instruction data is supplied in the upstream direction, the port switching means switches the port for receiving the synchronous clock to a corresponding port. Thus, each relay communication device which has received the switching instruction data can receive an identical synchronous clock via a route different from a previous one. The relay communication device also receives a fault generation notification, and the fault can be removed.

According to the present invention, another synchronous clock supply system comprises a clock sending means for sending a synchronous clock used to synchronize nodes in a network, one or a plurality of relay nodes which relay the synchronous clock to a sending destination, and a termination node serving as the sending destination of the synchronous clock. The clock sending means sends a synchronous clock to a clock supply route formed by coupling arbitrary virtual paths in the network for the nodes. The clock supply route extends to the termination node via the relay nodes. The relay node comprises a fault detection means for, when no synchronous clock is supplied in a downstream direction due to a fault in an upstream path closer to the clock sending means, detecting this state. When the fault detection means detects a fault, a fault notification data transmission means sends fault notification data representing occurrence of the fault to the downstream side of the clock supply route. When the fault notification data reaches the termination node, a port switching means performs port switching for supplying the synchronous clock from a predetermined port to another port. Accordingly, the synchronous clock can be supplied from the clock sending means to the termination node via another route. At the same time, the port switching instruction means of the termination node sends switching instruction data which instructs the upstream side of the clock supply route to switch the port to another one for supply of the synchronous clock. When the switching instruction data is supplied in the upstream direction, the port switching means switches the port for receiving the synchronous clock to a corresponding port. Thus, each relay node which has received the switching instruction data can receive an identical synchronous clock via a route different from a previous one. The relay node also receives a fault generation notification, and the fault can be removed.

According to the present invention, still another synchronous clock supply system comprises a clock sending means for sending a synchronous clock used to synchronize nodes in a network, one or a plurality of relay nodes which relay the synchronous clock to a sending destination, and a termination node serving as the sending destination of the synchronous clock. The clock sending means sends a synchronous clock to a plurality of clock supply routes formed by coupling arbitrary virtual paths in the network for the nodes. The clock supply routes extend to different termination nodes via the relay nodes. The relay node comprises a fault detection means for, when no synchronous clock is supplied in a downstream direction due to a fault in an upstream path closer to the clock sending means, detecting this state. When the fault detection means detects a fault, a fault notification data transmission means sends fault notification data representing occurrence of the fault to the downstream side of the clock supply route. When the fault notification data reaches the termination node, a port switching means performs port switching for supplying the synchronous clock from a predetermined port to another port. Accordingly, the synchronous clock can be supplied from the clock sending means to the termination node via another route. At the same time, the port switching instruction means of the termination node sends switching instruction data which instructs the upstream side of the clock supply route to switch the port to another one for supply of the synchronous clock. When the switching instruction data is supplied in the upstream direction, the port switching means switches the port for receiving the synchronous clock to a corresponding port. Thus, each relay node which has received the switching instruction data can receive an identical synchronous clock via a route different from a previous one. The relay node also receives a fault generation notification, and the fault can be removed.

According to the present invention, still another synchronous clock supply system comprises a clock sending means for sending a synchronous clock used to synchronize nodes in a network, one or a plurality of relay nodes which relay the synchronous clock to a sending destination, and a termination node serving as the sending destination of the synchronous clock. The clock sending means extracts a frequency component from a signal (including optical data) used for communication between the nodes in order to synchronize the nodes in the network. The clock sending means sends the frequency component as a synchronous clock having a unit time as a period to a clock supply route formed by coupling arbitrary virtual paths in the network for the nodes. The clock supply route extends to the termination node via the relay nodes. The relay node comprises a fault detection means for, when no synchronous clock is supplied in a downstream direction due to a fault in an upstream path closer to the clock sending means, detecting this state. When the fault detection means detects a fault, a fault notification data transmission means sends, as part of an ATM cell, fault notification data representing occurrence of the fault to the downstream side of the clock supply route. When the fault notification data reaches the termination node, a port switching means performs port switching for supplying the synchronous clock from a predetermined port to another port. Accordingly, the synchronous clock can be supplied from the clock sending means to the termination node via another route. At the same time, the port switching instruction means of the termination node sends, as part of an ATM cell, switching instruction data which instructs the upstream side of the clock supply route to switch the port to another one for supply of the synchronous clock. When the switching instruction data is supplied in the upstream direction, the port switching means switches the port for receiving the synchronous clock to a corresponding port. Thus, each relay node which has received the switching instruction data can receive an identical synchronous clock via a route different from a previous one. The relay node also receives a fault generation notification, and the fault can be removed. The present invention need not send a special clock signal to the clock supply route.

According to the present invention, still another synchronous clock supply system comprises a clock sending means for sending a synchronous clock used to synchronize nodes in a network, one or a plurality of relay nodes which relay the synchronous clock to a sending destination, and a termination node serving as the sending destination of the synchronous clock. The clock sending means extracts a frequency component from a signal (including optical data) used for communication between nodes in order to synchronize the nodes in the network. The clock sending means sends the frequency component as a synchronous clock having a unit time as a period to a plurality of clock supply routes formed by coupling arbitrary virtual paths in the network for the nodes. The clock supply routes extend to different termination nodes via the relay nodes. The relay node comprises a fault detection means for, when no synchronous clock is supplied in a downstream direction due to a fault in an upstream path closer to the clock sending means, detecting this state. When the fault detection means detects a fault, a fault notification data transmission means sends, as part of an ATM cell, fault notification data representing occurrence of the fault to the downstream side of the clock supply route. When the fault notification data reaches the termination node, a port switching means performs port switching for supplying the synchronous clock from a predetermined port to another port. Accordingly, the synchronous clock can be supplied from the clock sending means to the termination node via another route. At the same time, the port switching instruction means of the termination node sends, as part of an ATM cell, switching instruction data which instructs the upstream side of the clock supply route to switch the port to another one for supply of the synchronous clock. When the switching instruction data is supplied in the upstream direction, the port switching means switches the port for receiving the synchronous clock to a corresponding port. Thus, each relay node which has received the switching instruction data can receive an identical synchronous clock via a route different from a previous one. The relay node also receives a fault generation notification, and the fault can be removed. The present invention need not send a special clock signal to the clock supply route.

The present invention has described that the port is switched in accordance with the priority upon occurrence of a fault and the clock supply line priority table representing a port switching order is prepared at each node. By properly setting the priority in the table, the order of switching the port upon occurrence of a fault can be set in accordance with various situations such as the line quality.

In the present invention, a synchronous clock used to synchronize communication devices in a network is sent from a synchronous clock sending source to a termination node along a predetermined clock supply route via a plurality of nodes. When the synchronous clock sent in the synchronous clock sending step generates a fault in a line after the synchronous clock sending source, the fault is detected at a predetermined port at the nearest downstream node in the fault-generated line. The detecting node sends fault notification data representing occurrence of the fault to the termination node. When the fault notification data reaches the termination node, the port for receiving the synchronous clock is switched to a port which is connected to a path other than the synchronous clock sending source and clock supply route and is different from the port that has received the fault notification data at the termination node. In addition, switching instruction data representing port switching is sent back through the clock supply route. Each node which has received the switching instruction data switches the receiving port to a synchronous clock reception port. When a fault occurs in a line and no synchronous clock is sent from the synchronous clock sending source, each port is switched to obtain an identical synchronous clock from the synchronous clock sending source. A fault generation notification is also received, and the fault can be removed.

In the present invention, a frequency component is extracted from a signal (including optical data) used for communication between nodes in order to synchronize the nodes in a network. The frequency component is sent as a synchronous clock having a unit time as a period from a synchronous clock sending source to a termination node along a clock supply route formed by coupling arbitrary virtual paths for the nodes. When the synchronous clock sent in the synchronous clock sending step generates a fault in a line after the synchronous clock sending source, the fault is detected at a predetermined port at the nearest downstream node in the fault-generated line. The detecting node sends, as part of an ATM cell to the termination node, fault notification data representing occurrence of the fault. When the fault notification data reaches the termination node, the port for receiving the synchronous clock is switched to a port which is connected to a path other than the synchronous clock sending source and clock supply route and is different from the port that has received the fault notification data at the termination node. In addition, switching instruction data representing port switching is sent back as part of an ATM cell through the clock supply route. Each node which has received the switching instruction data switches the receiving port to a synchronous clock reception port. When a fault occurs in a line and no synchronous clock is sent from the synchronous clock sending source, each port is switched to obtain an identical synchronous clock from the synchronous clock sending source. A fault generation notification is also received, and the fault can be removed. The present invention need not send a special clock signal to the clock supply route.

As has been described above, according to the present invention, a termination communication device and each relay communication device which receives switching instruction data are switched to ports for receiving a synchronous clock via a route different from a previous one. These devices can receive a synchronous clock identical to a previous one. The devices also receive a fault generation notification, and the fault can be removed.

A termination node and each relay node which receives switching instruction data are switched to ports for receiving a synchronous clock identical to a previous one via a route different from a previous one. These nodes can receive a synchronous clock identical to a previous one. The nodes also receive a fault generation notification, and the fault can be removed.

A termination node and each relay node which receives switching instruction data are switched to ports for receiving a synchronous clock via a route different from a previous one. These nodes can receive a synchronous clock identical to a previous one. The nodes also receive a fault generation notification, and the fault can be removed. In order to synchronize nodes in a network by the synchronous clock, a frequency component is extracted from a signal (including optical data) used for communication between the nodes, and is used as a synchronous clock having a unit time as a period. No special clock signal need be sent to the clock supply route.

What is claimed is:

1. A synchronous clock supply system comprising:
at least one relay node which is positioned in a clock supply route formed by coupling arbitrary virtual paths for a loop of nodes in a network; and
a termination node which is positioned in a downstream side of the clock supply route farther than the relay node from a synchronous clock sending source used to synchronize the nodes in the network, and finally receives the synchronous clock via a predetermined port,
the relay node having
a clock supply line priority table representing a priority for port switching for supplying the synchronous clock is prepared at each node, wherein a priority is set for a port to be switched,
fault detection means for, when no synchronous clock is supplied in a downstream direction from an upstream side of the clock supply route due to a fault in the virtual path, detecting that no synchronous clock is supplied,
fault notification data transmission means for, when said fault detection means detects the fault, sending fault notification data representing occurrence of the fault to the downstream side of the clock supply route,
first port switching means for, when switching instruction data designating switching to another port for supply of the synchronous clock is sent in the upstream side from the downstream side of the clock supply route, switching a port for receiving the synchronous clock to the port, a clock sending means which sends out a clock received from one of a connecting device or an internal clock supply source as the synchronous clock to said clock supply route, and the termination node having second port switching means for, when another port is connected to the sending source via another virtual path and the fault notification data is sent from the relay node, performing port switching for supplying the synchronous clock from the predetermined port to said another port, the first and second port switching means forming upstream and downstream switching ports, and port switching instruction means for, when said port switching means performs port switching by detection of the fault notification data, sending switching instruction data which instructs the upstream side of the clock supply route to switch the port to said another port for supply of the synchronous clock.

2. A system according to claim 1, wherein the clock supply route includes a plurality of clock supply routes, the synchronous clock is sent to the respective clock supply routes, the relay node includes relay nodes for the respective clock supply routes, and the termination node includes termination nodes for the respective clock supply routes.

3. A system according to claim 1, wherein the synchronous clock includes a synchronous clock which is obtained by extracting a frequency component from a signal used for communication between the nodes and has a unit time as a period, said fault notification data transmission means sends the fault notification data as part of an ATM cell, when the switching instruction data is sent as part of an ATM cell from the upstream direction, said first port switching means switches the port for receiving the synchronous clock to a port which receives the switching instruction data, when the fault notification data is sent as part of the ATM cell from the relay node, said second port switching means switches the port for supplying the synchronous clock from the predetermined port to said another port, and said port switching instruction means sends the switching instruction data as part of an ATM cell.

4. A system according to claim 3, wherein the clock supply route includes a plurality of clock supply routes, the synchronous clock is sent to the respective clock supply routes, the relay node includes relay nodes for the respective clock supply routes, and the termination node includes termination nodes for the respective clock supply routes.

5. A synchronous clock supply method comprising the steps of:

sending a synchronous clock used to synchronize nodes in a network from a synchronous clock sending source to a termination node along a predetermined clock supply route via a plurality of nodes;

wherein at least one node is a switching unit comprising:

a clock supply line priority table representing a priority for port switching for supplying the synchronous clock is prepared at each node, wherein a priority is set for a port to be switched, when the synchronous clock sent in the synchronous clock sending step generates a fault in a line after the synchronous clock sending source, detecting the fault at a predetermined port at a nearest downstream node in the fault generated line;

sending fault notification data representing occurrence of the fault from the detecting node in the fault detection step to the termination node;

when the fault notification data sent in the fault notification data sending step reaches the termination node, switching a port for receiving the synchronous clock to a port which is connected to a path other than the synchronous clock sending source and the clock supply route and is different from the port that has received the fault notification data at the termination node, and sending back switching instruction data representing port switching by coupling arbitrary virtual paths for nodes; and switching the receiving port to a synchronous clock reception port at each node which has received the switching instruction data sent in the port switching instruction step.

6. A method according to claim 5, wherein in the synchronous clock sending step, a frequency component is extracted from a signal used for communication between the nodes in order to synchronize the nodes in the network, and is used as a synchronous clock having a unit time as a period, in the fault notification data sending step, the fault notification data is sent as part of an ATM cell, and in the port switching instruction step, the switching instruction data is sent as part of an ATM cell.

7. A system according to claim 1, wherein there are four nodes.

8. A method according to claim 5, wherein there are four nodes.

9. A system according to claim 1, wherein at least one node is a switching unit comprising:

a control unit;

a linearly arranged input line unit ATM switch and output line unit, each connected to the control unit;

a line master unit connected to the control unit;

a linearly connected clock generation source and clock input circuit connected to the line master unit; and at least one clock input circuit connected to the line master unit.

10. A method according to claim 5, wherein at least one node is a switching unit comprising:

a control unit;

a linearly arranged input line unit ATM switch and output line unit, each connected to the control unit;

a line master unit connected to the control unit;

a linearly connected clock generation source and clock input circuit connected to the line master unit; and at least one clock input circuit connected to the line master unit.

11. A method according to claim 5, wherein the plurality of nodes form a loop.

12. A method according to claim 5, wherein the ports comprise upstream and downstream ports.

13. A synchronous clock supply system comprising:

at least one relay node which is positioned in a clock supply route formed by coupling arbitrary virtual paths for a loop of nodes in a network; and a termination node which is positioned in a downstream side of the clock supply route farther than the relay node from a synchronous clock sending source used to synchronize the nodes in the network, and finally receives the synchronous clock via a predetermined port, the relay node having a clock supply line priority table representing a priority for port switching for supplying the synchronous clock is prepared at each node, wherein a priority is set for a port to be switched, a fault detector for, when no synchronous clock is supplied in a downstream direction from an upstream side of the clock supply route due to a fault in the virtual path, detecting that no synchronous clock is supplied, a fault notification data transmitter for, when said fault detector detects the fault, sending fault notification data representing occurrence of the fault to the downstream side of the clock supply route, and a first port switch for, when switching instruction data designating switching to another port for supply of the synchronous clock is sent in the upstream side from the downstream side of the clock supply route, switching a port for receiving the synchronous clock to the port, thereby forming upstream and downstream switching ports, and the termination node having a second port switch for, when another port is connected to the sending source via another virtual path and the fault notification data is sent from the relay node, performing port switching for supplying the synchronous clock from the predetermined port to said another port, and a port switching instruction device for, when said port switches perform port switching, sending switching instruction data which instructs the upstream side of the clock supply route to switch the port to said another port for supply of the synchronous clock.

14. A system according to claim 13, further comprising a clock sending device for sending the synchronous clock to the clock supply route.

15. A system according to claim 13, wherein
the clock supply route includes a plurality of clock supply routes,
the synchronous clock is sent to the respective clock supply routes,
the relay node includes relay nodes for the respective clock supply routes, and
the termination node includes termination nodes for the respective clock supply routes.

16. A system according to claim 13, wherein there are four nodes.

17. A system according to claim 13, wherein at least one node is a switching unit comprising:
a control unit;
a linearly arranged input line unit ATM switch and output line unit, each connected to the control unit;
a line master unit connected to the control unit;
a linearly connected clock generation source and clock input circuit connected to the line master unit; and
at least one clock input circuit connected to the line master unit.

* * * * *